United States Patent [19]

Tolner et al.

[11] Patent Number: 4,858,368
[45] Date of Patent: Aug. 22, 1989

[54] FISHING LURE

[76] Inventors: Raymond C. Tolner; Betty J. Tolner, both of P.O. Box 425, Wayland, N.Y. 14572

[21] Appl. No.: 269,446

[22] Filed: Nov. 10, 1988

[51] Int. Cl.⁴ ............................................. A01K 85/00
[52] U.S. Cl. .................................. 43/42.36; 43/42.06
[58] Field of Search ................. 43/42.05, 42.06, 42.25, 43/42.35, 42.36, 42.38, 42.39

[56] References Cited

U.S. PATENT DOCUMENTS

| | | | |
|---|---|---|---|
| D. 162,018 | 2/1951 | Finberg | D22/126 |
| D. 214,498 | 6/1969 | Walters | D22/126 |
| D. 296,123 | 6/1988 | Davis | D22/126 |
| 2,521,616 | 9/1950 | Weber | D22/125 |
| 2,642,695 | 6/1953 | Burns | D22/126 |
| 2,745,206 | 5/1956 | Gaw | 43/44.9 |
| 3,010,243 | 11/1961 | Dickinson | D22/125 |
| 3,555,717 | 1/1971 | Gautsche | 43/42.39 |
| 3,680,249 | 8/1972 | Chiarenza | 43/42.06 |
| 3,807,079 | 4/1974 | Goforth | 43/42.17 |
| 4,074,455 | 2/1978 | Williams | D22/125 |

*Primary Examiner*—M. Jordan
*Attorney, Agent, or Firm*—Terry M. Gernstein

[57] ABSTRACT

A fishing lure includes a semi-rigid, translucent inner body having a bore therethrough which accommodates a fishing line therethrough and an outer body of woven material that encases the inner body. The outer body includes a tail portion that is unwoven. A head is attached to the outer body to attach the outer body to the inner body, and a hackle includes two portions of bristle-like material attached to the head. The lure is attached to the fishing line by cutting that line and slipping the line through the bore in the lure with the unwoven portion of the lure outer body located on the line to be adjacent to a spinner and a hook which are then attached to the fishing line.

10 Claims, 1 Drawing Sheet

U.S. Patent  Aug. 22, 1989  4,858,368
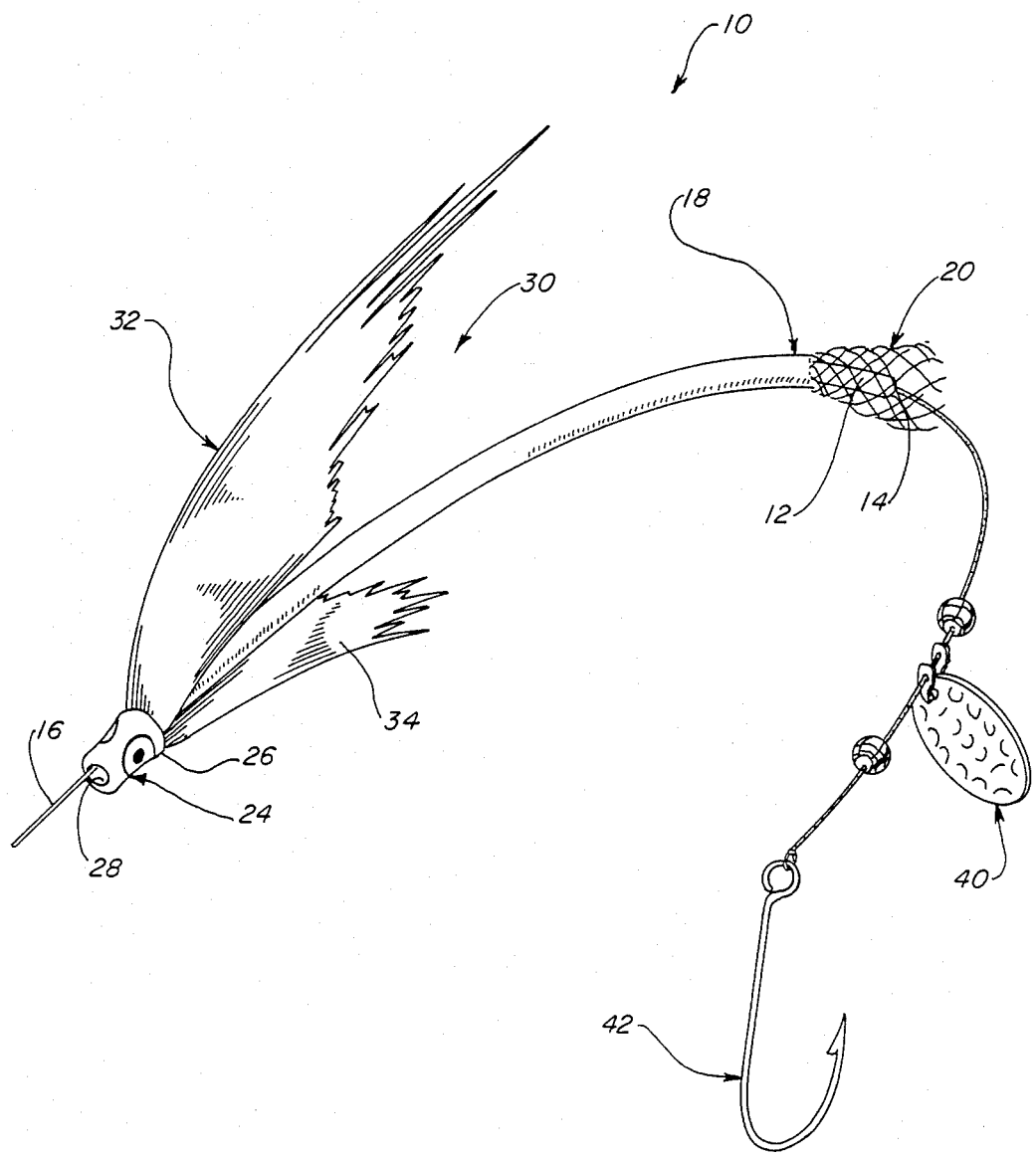

FISHING LURE

TECHNICAL FIELD OF THE INVENTION

The present invention relates in general to the field of fishing, and to the specific field of fishing lures.

BACKGROUND OF THE INVENTION

Fisherman are notorious for their preferences of lures and methods. There are almost as many different types of lures as there are fisherman, with each fisherman having his own favorite lure for each situation. Accordingly, there are many different designs for fishing lures that have been proposed. See, for example, the lures disclosed in patents such as U.S. Pat. Nos. 2,521,616, 2,642,695, 2,745,206, 3,807,079 and 4,074,455 as well as others.

However, all of these lures are somewhat difficult to attach and detach from the fishing line and thus are not easily changed. This problem has somewhat inhibited the commercial acceptance of the fishing lures because a lure cannot be quickly altered to fit a particular situation by the fisherman.

Accordingly, there is a need for a fishing lure that can be easily and inexpensively altered and changed as the needs and desires of the fisherman change.

OBJECTS OF THE INVENTION

It is a main object of the present invention to provide a fishing lure that is easily and quickly changed by the fisherman.

It is another object of the present invention to provide a fishing lure that closely resembles the particular bait desired by the fisherman, yet is still easy and inexpensive to assemble.

It is another object of the present invention to provide a fishing lure that is easily modified in the field.

SUMMARY OF THE INVENTION

These, and other, objects are accomplished by providing a fishing lure that is formed of readily available materials, such as semi-rigid plastic tubing and woven tubing and which includes a shrink wrap applied head and a hackle means formed of bristle like materials.

The semi-rigid plastic tubing forms the inner body of the lure, and the fishing line is accommodated therethrough. The Woven tubing forms the outer body and encases the inner body, and includes a head end and a tail end. A head simulating means is affixed to the head end of the body and the tail end of the woven body is unwoven. The lure also includes a hackle means on the head end.

The lure is easily placed on a fishing line by simply cutting the line at a convenient location, such as behind a spinner, threading the line through the inner body of the lure, and then connecting the spinner or the hook to the line. If the lure is to be changed, it is also a simple task to simply cut the line remove the old lure and replace it with a new lure, and then re-connect the line as desired.

In this manner, various lures can be stored by the fisherman so a wide variety of situations can be accommodated. The lures can thus be formed of various lengths, various colors and color combinations, as Well as various sizes as desired. Any of the lures can then be changed for another lure as the situation dictates.

BRIEF DESCRIPTION OF THE FIGURE

The FIGURE is a perspective view of a lure embodying the present invention.

DETAILED DESCRIPTION OF THE PREFERRED EMBODIMENT

Shown in the FIGURE is a lure 10 embodying the present invention. The lure 10 includes an elongated inner body 12 formed of translucent, semi-rigid material, such a plastic tubing, or the like and which includes a forward end and a rear end 14. The inner body 12 is tubular and includes a longitudinally extending bore through which fishing line 16 fits.

The lure 10 further includes an outer body 18 formed of woven material and Which includes a head end adapted to be located immediately adjacent to the inner body forward end, and a tail end 20 adapted to be located adjacent to the inner body rear end. The tail end 20 is unwoven to form an open mesh-like structure that extends outwardly from the remainder of the body to simulate a tail-like element as it moves and undulates in the water When the lure is moved through the water.

The lure 10 further includes a head means 24 that is formed of a plastics-like material that can be shrink wrapped onto the rest of the body to attach the head means 24 to that body The head means 24 includes an eye-simulating area 26 and has a bore 28 defined therein that is aligned with the bore in the inner body 12 and is adapted to accommodate the fishing line 16 therethrough.

The head means 24 is fixedly attached to the bodies 12 and 18 to fixedly attach those two bodies together.

The lure 10 further includes a hackle means 30 that simulates the fins of a small fish or the like when the lure is moved through the water. The hackle means 30 includes a first portion 32 on one side of the lure and a second portion 34 on a diametrically opposite side of the lure. The first portion 32 is larger than the second portion 34 and will be on top of the lure when it is pulled through the water.

The lure 10 can have a variety of sizes, shapes, colors and color combinations whereby a variety of different lure configurations can be used depending on the needs and desires of the fisherman. For example, the lure can be less than one inch in length as measured from the front tip of the head means 24 to the back end of the woven portion 20 to attract small fish, or can be more than five inches long to attract large fish. Furthermore, the lure can have a variety of colors, such as a shiny, reflective color, such as silver, gold or the like, for the body 118, and a variety of colors for the hackle means, such as red, black, green, brown, orange, white, gold or the like, or a combination of such colors. The top portion 32 can be the same color as the bottom portion 34, or the colors can be different, and the colors of the hackle and its portions can be the same as or different from the body portion colors. The various colors identified above are for purposes of example only and are not intended as limiting.

As can be understood by one skilled in the art from the above description, any color combination can be selected, and the size of the lure can be selected to produce the desired action.

The lure 10 is easily placed on the fishing line 16 by cutting that line at a convenient location which is spaced from a spinner 40 and a hook 42, threading the line through the lure, and then re-attaching the spinner and the hook to the line. The detachment of one lure and attachment of another lure is thus seen to be quite easy. The lures are quite inexpensive, and thus a wide variety of lures is available to the fisherman so he can change lures any time he feels the need or the desire to do so.

It is to be understood that while certain forms of the present invention have been illustrated and described herein, it is not to be limited to the specific forms or arrangement of parts described and shown.

We claim:
1. A fishing lure comprising:
 (A) an elongated flexible tubular body which includes
  (i) an inner body of semi-rigid translucent material having a longitudinally extending bore for accommodating a fishing line therethrough, and
  (ii) an outer body of Woven material covering said inner body, said outer body having a tail end and a head end with said tail end being unwoven and expanded outwardly of the remainder of said outer body;
 (B) a head fixedly attached to said head end of said outer body and including eye simulating means thereon; and
 (C) a hackle means attached to said head to extend outwardly of said outer body on diametric opposite sides of said outer body.

2. The fishing lure defined in claim 1 further including a spinner mounted on the fishing line adjacent to said unwoven tail end.

3. The fishing lure defined in claim 2 further including a fishing hook attached to the fishing line adjacent to said spinner.

4. The fishing lure defined in claim 3 wherein said outer body and said hackle means are different colors.

5. The fishing lure defined in claim 4 wherein said outer body is reflective.

6. The fishing lure defined in claim 5 wherein said head and said outer body are different colors.

7. The fishing lure defined in claim 6 wherein said hackle means is multi-colored.

8. The fishing lure defined in claim 7 wherein said outer body is less than one inch in length as measured from said head end to said tail end.

9. The fishing lure defined in claim 7 wherein said outer body is greater than five inches in length as measured from said head end to said tail end.

10. The fishing lure defined in claim 7 wherein said hackle means includes a first portion and a second portion with said first portion being larger than said second portion and on one side of said outer body with the second portion being on the other side of said body.

* * * * *